United States Patent
Buczek et al.

(10) Patent No.: US 6,545,828 B2
(45) Date of Patent: *Apr. 8, 2003

(54) OPTICAL DEVICE WITH ABSORPTION GRADIENT AND SELECTIVE SPECTRAL FILTERING AND LENS ASSEMBLY AND CAMERA FITTED WITH SUCH A DEVICE

(75) Inventors: Harthmuth Buczek, Marin (CH); Joachim Grupp, Neuchâtel (CH)

(73) Assignee: Asulab S.A., Bienne (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/552,720

(22) Filed: Apr. 19, 2000

(65) Prior Publication Data

US 2002/0030906 A1 Mar. 14, 2002

(30) Foreign Application Priority Data

Apr. 21, 1999 (EP) .............................. 99107887

(51) Int. Cl.[7] .............................. G02B 5/22; G02B 7/182
(52) U.S. Cl. ...................... 359/888; 359/885; 359/350; 359/361; 252/586

(58) Field of Search .................................. 359/885, 888, 359/890, 350, 361, 857; 250/586; 356/346

(56) References Cited

U.S. PATENT DOCUMENTS

| | | | | |
|---|---|---|---|---|
| 3,843,235 A | * | 10/1974 | Mino et al. .................. | 359/888 |
| 5,024,923 A | * | 6/1991 | Suzuki et al. ............... | 359/885 |
| 5,329,350 A | * | 7/1994 | Wright et al. ............... | 359/857 |
| 5,801,831 A | * | 9/1998 | Sargoytchev ............... | 356/346 |
| 6,078,442 A | * | 6/2000 | Tada et al. .................. | 359/888 |
| 6,180,955 B1 | * | 1/2001 | Doggett et al. ............. | 250/586 |

OTHER PUBLICATIONS

Patent Abstracts of Japan, vol. 007, No. 096 (P–193), Apr. 22, 1983 & JP 58 023010 A, Feb. 10, 1983.
Patent Abstracts of Japan, vol. 017, No. 626 (P–1647), Nov. 18, 1993 & JP 05 203 884 A, Aug. 13, 1993.

* cited by examiner

*Primary Examiner*—Audrey Chang
(74) *Attorney, Agent, or Firm*—Sughrue Mion, PLLC

(57) ABSTRACT

An optical device, for homogenising the lighting in an image plane, defined by a digital optical sensor wherein the optical device is formed of a block made of transparent homogenous filtering material, this block having a substantially uniform absorption coefficient for all the wavelengths of the visible optical spectrum which pass through it, and having a variable thickness suited to a determined absorption profile.

10 Claims, 2 Drawing Sheets

OPTICAL DEVICE WITH ABSORPTION GRADIENT AND SELECTIVE SPECTRAL FILTERING AND LENS ASSEMBLY AND CAMERA FITTED WITH SUCH A DEVICE

BACKGROUND OF THE INVENTION

The present invention concerns an optical device with an absorption gradient intended to assure homogeneous lighting in the image plane of a lens assembly. The invention also concerns an optical device of this type forming a spectral filter intended to filter selectively spectral bands in the total optical spectrum passing through said optical device. Finally the invention concerns a lens assembly and a camera fitted with an optical device of the aforementioned type.

In order to make a good quality lens assembly for a digital camera, a spectral filter has to be incorporated to remove the red and infrared to which the semiconductor type optical sensors which are fitted to such cameras are very sensitive. An absorption gradient filter also has to be incorporated to homogenise the lighting in the image plane of the lens assembly. Indeed, the camera lens assemblies which are currently available on the market often have a problem of lighting uniformity in their image plane, which results in a substantial reduction in the lighting from the centre of the image plane to the edges thereof. This problem is linked to the fact that the lenses of which such lens assemblies are formed are often spherical lenses. Such lenses are commonly used because they are simple to manufacture by grinding and polishing using abrasive powders. Unfortunately, these lenses are the most inadequate from the point of view of lighting as will be explained with reference to FIG. 1 annexed to the present Application.

The aforementioned FIG. 1 shows two points respectively designated by the alphabetic references A and B. These two points A and B are in the image plane 1 of a spherical lens 2. As FIG. 1 shows, point A is situated on optical axis 4 of lens 2, whereas point B is situated at a distance from axis 4. The projection factor or useful aperture of lens 2 for points A and B will be called respectively α and β. It is to be noted that the useful aperture becomes smaller for a point which is situated outside the axis, in other words β<α. Consequently, the lighting, i.e. the energy per surface unit, decreases for a point situated outside the axis. This is confirmed by the fact that lighting E varies in accordance with the ratio $E=E_o \cos^4 \omega$, where E is the incident lighting and ω is the angle between the optical axis and the straight line linking a point of the image plane at the centre of the lens. Thus, for a point situated on the optical axis, ω=0 and $E=E_o$ is maximum. Conversely, for a point situated outside the optical axis, angle ω increases and the resulting lighting E decreases.

In order to attempt to compensate for the unfavourable effects of spherical lenses from the point of view of lighting, several solutions can be envisaged. One of these solutions consists in using aspherical lenses or combinations of a large number of spherical lenses. Another known solution consists in using an absorption gradient filter. Such a filter generally takes the form of a substantially plane substrate arranged in or in proximity to the actual image plane or an intermediate image plane. According to a first alternative embodiment, one of the faces of the substrate is coated with a thin film of reflective material such as aluminium. This film has the particularity of being thicker and thus more reflective, at its centre than in its peripheral zone. It thus enables the lighting in the image plane of the lens assembly to be homogenised by reducing the lighting at the centre of the image plane, whereas it allows more light to pass on the edges of said image plane. According to another embodiment, the absorption gradient filter is made of a spun-dyed material whose optical density decreases from the centre towards the edges of the filter. Other even more complex absorption gradient filters can also be used.

The corrective measures which have just been described have the drawback of being expensive. In particular, the lens assembly has to be mounted in a clean environment such as a clean room, and the filters have to be encapsulated in order to be protected from dust, which means high costs. Moreover, integration of two additional elements in the optical path of the lens assemblies means that the lens assemblies cannot be miniaturised and compact. Finally, far from the optical axis of the lens assembly, the angle formed by the incident light with the surface of the absorption gradient filter increases, which causes an increase in the quantity of light reflected by the surface of said filter, and thus a decrease in the light which reaches the optical sensor fitted to digital cameras.

SUMMARY OF THE INVENTION

The object of the present invention is to overcome the above problems and drawbacks by providing an optical device which allows the functions of spectral filter and absorption gradient filter to be combined in the same element.

The present invention therefore concerns an optical device intended to homogenise the lighting in an image plane, in particular defined by a digital optical sensor, characterised in that it is formed of a block of transparent filtering homogenous material, this block having a substantially uniform absorption coefficient for all the wavelengths of the visible optical spectrum passing through it, and having a variable thickness suited to a determined absorption profile.

As a result of these features, the present invention provides an optical device whose thickness, suitably selected, generates gradual absorption, allowing uniform luminosity in the image plane of the lens assembly fitted with such a device to be obtained. Compared to absorption gradient filters of the prior art, as a result of its monolithic structure, the device according to the invention is simple and inexpensive to manufacture. It is also compact, so that it can easily be integrated into a lens assembly.

According to a complementary feature of the invention, the block of transparent filtering material forms a lens.

According to another feature of the invention, the optical device has a high value absorption coefficient for wavelengths comprised in a determined spectral band.

Thus, unlike the prior art wherein, in order to make a good quality lens assembly for a digital camera, an absorption gradient filter, a spectral filter and a lens had to be mounted in the optical path of said lens assembly, the present invention enables the functions of these two filters and the lens to be joined in the same optical element. This allows the cost price of the lens assembly to be limited, on the one hand by reducing the number of parts necessary for the mounting thereof, and on the other hand by simplifying manufacture, since only the space separating the optical device according to the invention from the image sensor has to be encapsulated in order to guarantee efficient protection against dust.

The present invention also concerns a photographic lens assembly including an optical device of the aforementioned type, as well as a camera fitted with such a lens assembly.

BRIEF DESCRIPTION OF THE DRAWINGS

Other features and advantages of the present invention will appear more clearly upon reading the following detailed description of an embodiment example of the optical device according to the invention, this example being given purely by way of illustrative and non limiting example, in conjunction with the annexed drawings, in which.

DETAILED DESCRIPTION OF THE INVENTION

A preferred example of the application of the optical device according to the present invention relates to digital cameras. As a result of the present invention, it is possible to offer the user an inexpensive and compact lens assembly, while guaranteeing homogenous lighting in the image plane of said lens assembly, as well as selective spectral filtering allowing the wavelengths situated in the infrared spectral band, to which the semiconductor optical sensors which are fitted to this type of camera are very sensitive, to be removed. However, it goes without saying that the present device could be applied in a similar manner to any other optical system, such as, for example, a conventional camera fitted with a photosensitive film, in which it is also necessary to homogenise lighting, and in which, if necessary the ultraviolet rays to which the photosensitive film may be sensitive can be removed.

Figure 1:
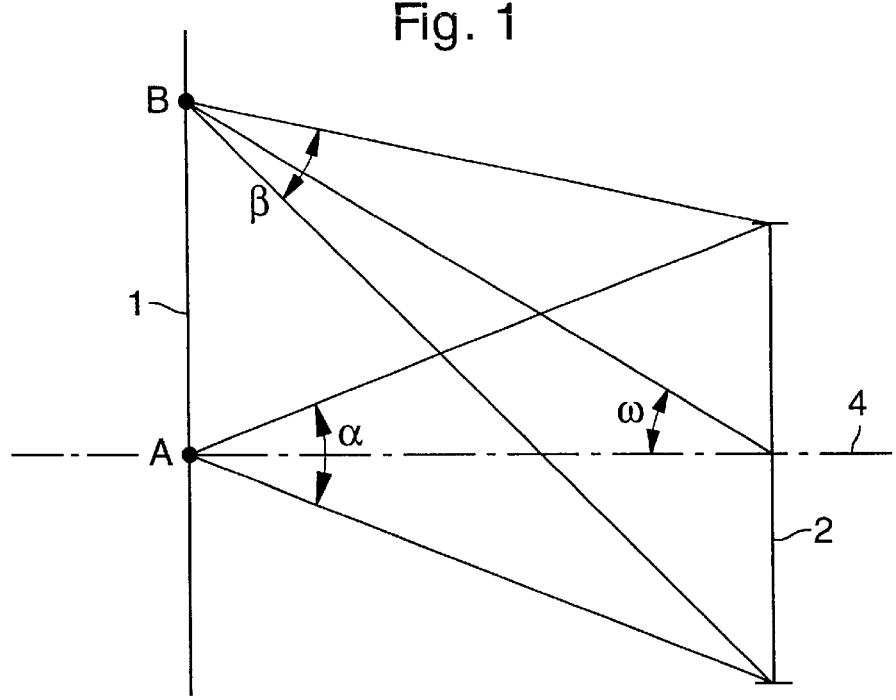
FIG. 1 which has already been cited, is a schematic diagram of a spherical lens and its associated image plane.
Figure 2:
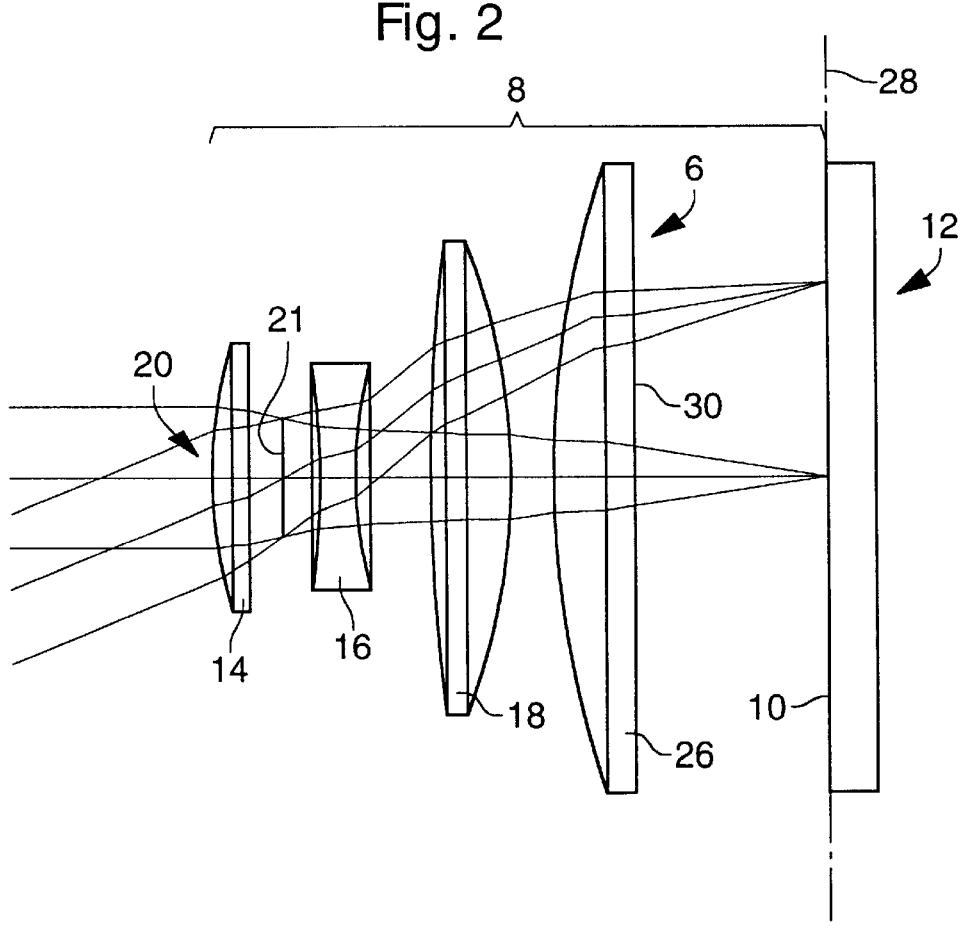
FIG. 2 is a schematic view of the optical device according to the invention.

As FIG. 2 shows, the optical device according to the invention, designated as a whole by the general numerical reference 6, is integrated in the optical path of a photographic lens assembly 8 placed in front of the entry face 10 of a semiconductor optical sensor 12. This optical sensor 12 is fitted, for example, to a digital camera which is not shown in the Figures.

Photographic lens assembly 8 includes, in addition to optical device 6 according to the invention, three lenses respectively designated by the references 14, 16 and 18 from the entry face 20 of lens assembly 8 situated on the side of the object to be photographed. In the example shown in FIG. 2, the three lenses, 14, 16 and 18 are spherical lenses. More precisely, lens 14 is a plane-convex lens, lens 16 is a biconcave lens, and lens 18 is a biconvex lens.

The three lenses 14, 16 and 18 are made of glass, plastic or any other transparent optical material. It will be understood, of course, that the embodiment of photographic lens assembly 8 described above is given purely by way of illustrative and non limiting example, said lens assembly 8 being able to include a combination of a larger or smaller number of spherical and/or aspherical lenses according to the complexity of the optics of lens assembly 8.

Figure 3:
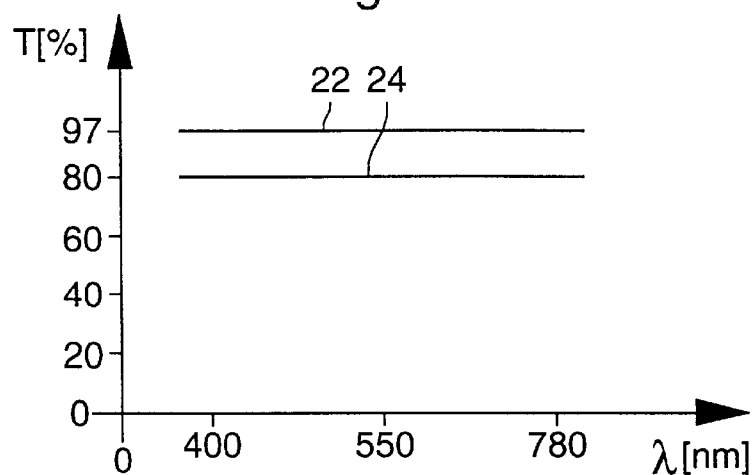
FIG. 3 is a graphic diagram of the light transmission rate of a neutral filtering material.

We are concerned now with optical device 6 according to the invention. According to a first feature of the invention, optical device 6 takes the form of a block made of a homogenous transparent filtering material. For the purposes of the invention, filtering material means a material having an absorption coefficient which is substantially the same for all the wavelengths of the visible optical spectrum which pass through it. A material of this type is also called a neutral filtering material. Some examples of filtering materials are illustrated in FIG. 3 which shows the light transmission rate T expressed in percentages as a function of the optical wavelength λ expressed in nanometers which passes through said filtering material. Curve 22 represents a material filtering at 3%. In other words 97% of the light is transmitted. Curve 24 represents a material filtering at 20%, i.e. absorbing 20% of the light energy, and allowing 80% to pass. As can be seen in FIG. 3, curves 22 and 24 are horizontal straight lines, which means that the absorption is substantially uniform for the whole of the visible optical spectrum passing through the filtering material.

Thus, by selecting a suitable absorption coefficient value and by varying the thickness of the block of filtering material as a function of the distance to the optical axis from lens assembly 8, a determined gradual absorption profile can be achieved which allows homogeneous lighting to be obtained in the image plane of the lens assembly fitted with such a block of filtering material. For this purpose, and according to another feature of the invention, the absorption in a peripheral zone of the block of filtering material is less than the absorption in a central region of the same block. Consequently, the block of transparent homogenous filtering material reduces the lighting at the centre of the image plane of the lens assembly, whereas it allows more light to pass on the edges of said image plane.

One advantage of optical device 6 according to the invention lies in its homogenous structure. As was described in the introductory part of the present Application, the filters of the prior art generally have a heterogeneous structure, with either a thin film added to the surface of a substrate whose thickness, which varies from the centre towards the edges of said substrate, has to be accurately controlled, or a variation in the optical density which is always difficult to control properly. Conversely, as a result of its monolithic structure, device 6 according to the invention is very simple to machine, and thus allows substantial savings to be made in manufacturing terms.

According to a preferred alternative embodiment of the invention, optical device 6 takes the form of a lens 26 which is thicker at its centre than towards its edges, so that it has a suitable absorption profile allowing homogeneous lighting to be obtained in an image plane 28 of lens assembly 8. As shown in FIG. 2, lens 26 is a spherical plane-convex lens whose curvature is suited to the focal distance of lens assembly 8. During mounting of lens assembly 8 only the space between lens 26 and optical sensor 12 is hermetically sealed in order to prevent dust penetration. This encapsulation operation is facilitated by the fact that the rear face 30 of lens 26 which is situated facing entry face 10 of optical sensor 12 is plane. Lens assembly 8 is thus formed of four lenses 14, 16, 18 and 26 which are arranged in such a way that image plane 28 of said lens assembly 8 is in the photosensitive plane of optical sensor 12.

According to another feature of the invention, the block of filtering material further has a high absorption coefficient value for wavelengths comprised within a determined spectral band. Thus, as a result of the present invention, the functions of absorption gradient filter and spectral filter can be joined in a same optical element. This particularly advantageous arrangement of the invention allows the cost price of lens assembly 8 to be limited by reducing the number of elements necessary for the mounting thereof. It also allows a substantially less cumbersome and more compact lens assembly 8 to be provided since only the block of filtering material has to be integrated in the optical path of said lens assembly 8. By way of example, the values of the distances between the various optical elements are respectively:

- 0.6 mm between lens 14 and the diaphragm opening 21;
- 0.29 mm between diaphragm opening 21 and lens 16;
- 0.56 mm between lens 16 and lens 18;
- 0.1 mm between lens 18 and lens 26 according to the invention.

Moreover, the diameter of lens assembly 8 is smaller than the diagonal of the active surface of optical sensor 12. Such a compact structure is made possible as a result of the present invention which allows three distinct optical elements to be combined in a single one.

Figure 4:
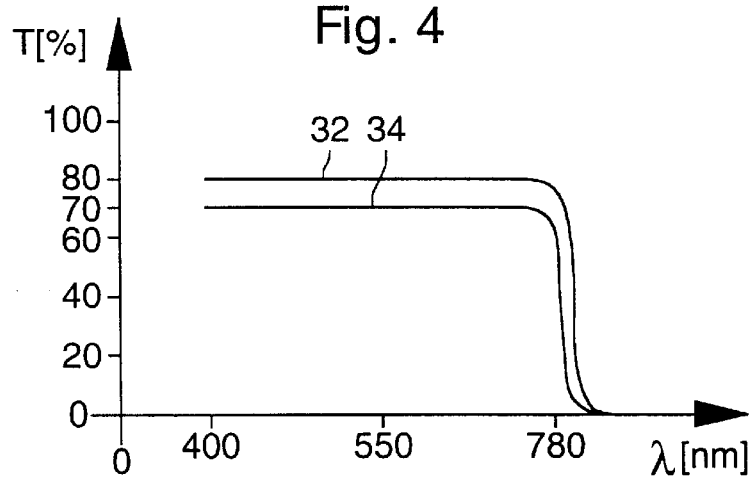
FIG. 4 is a graphic diagram of the light transmission rate of a strong infrared light absorbent material.

In the case of a digital camera, the block of filtering material will have to absorb strongly the infrared rays to which semiconductor optical sensor 12 is very sensitive. For this purpose, the block of filtering material could, for example, be made of a glass marketed by the Schott company under the reference BG39. The light spectrum transmission profile of this material is shown schematically in FIG. 4. Curves 32 and 34 correspond to two different thicknesses $e_1$ and $e_2$ of glass BG39 of the order of 1 mm and 2 mm respectively. Transmission rate T is approximately 80% for curve 32 and 70% for curve 34. It is thus to be noted that the absorption of glass BG39 is substantially constant in the visible optical spectrum range and that it increases sharply in the infrared range (strong reduction in transmission rate T). It will be noted that the thickness of the block of filtering material is sufficient to remove by absorption any perturbating infrared light.

Figure 5:
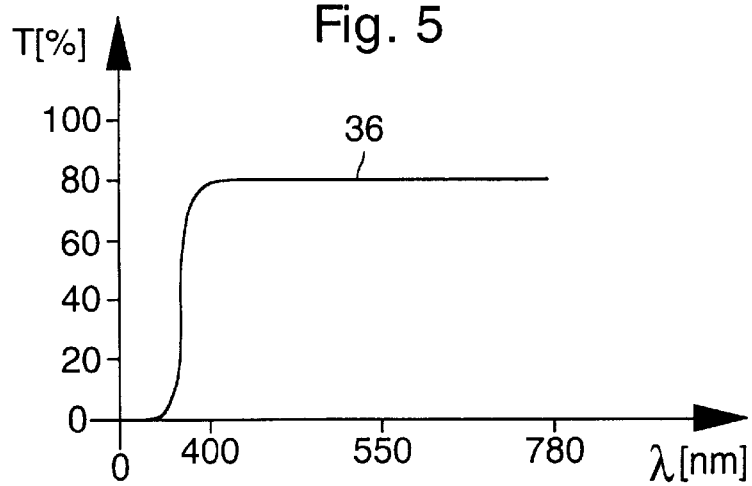
FIG. 5 is a graphic diagram of the light transmission rate of a strong ultraviolet light absorbent material.

Conversely, in the case of a conventional camera fitted with a photosensitive film, a material having a substantially constant absorption rate in the visible spectrum range will be selected, and decreasing sharply in the ultraviolet range (see curve 36, FIG. 5).

The present invention also concerns a lens assembly fitted with an optical device 6 of the aforementioned type, as well as a camera fitted with such a device.

It goes without saying that various simply modifications and variants fall within the scope of the present invention.

What is claimed is:

1. An optical device for homogenizing the lighting in an image plane of an image-forming optical sensor, wherein the optical device is formed of a single-piece block made of transparent homogenous filtering material, said block having a substantially uniform absorption coefficient for all wavelengths of the visible optical spectrum which pass through said block, and having a variable thickness suited to a determined absorption profile the absorption in a peripheral zone being less than the absorption in a central region of the block of transparent material, wherein the block of transparent filtering material forms a lens which focuses the lighting on said image plane of said sensor.

2. An optical device according to claim 1, wherein the lens is spherical.

3. An optical device according to claim 2, wherein the lens is plane-convex.

4. An optical device according to claim 1, wherein the block of transparent filtering material also has a high absorption coefficient value for wavelengths comprised within a determined spectral band of non-visible light.

5. An optical device according to claim 4, wherein the block of transparent filtering material is substantially opaque in the infrared range.

6. An optical device according to claim 4, wherein the block of transparent filtering material is substantially opaque in the ultraviolet range.

7. An optical device according to claim 1, wherein the image-forming optical sensor is a digital sensor.

8. A photographic lens assembly including a plurality of lenses selected from the group consisting of spherical and aspherical lenses, and further including an optical device for homogenizing the lighting in an image plane of an image-forming optical sensor, wherein the optical device is formed of a single-piece block made of transparent homogenous filtering material, said block having a substantially uniform absorption coefficient for all wavelengths of the visible optical spectrum which pass through said block, and having a variable thickness suited to a determined absorption profile, the absorption in a peripheral zone being less than the absorption in a central region of the block of transparent material, and no lens of the lens assembly being disposed between said block and said optical sensor, wherein the block of transparent filtering material forms a lens which focuses the lighting on said image plane of said sensor.

9. The photographic lens assembly according to claim 8, wherein the spherical and aspherical lenses and the optical device are arranged so that the image plane of said lens assembly is in a photosensitive plane of the optical sensor.

10. A camera comprising a photographic lens assembly according to claim 8.

* * * * *